(12) United States Patent
Mackey et al.

(10) Patent No.: US 7,000,146 B2
(45) Date of Patent: Feb. 14, 2006

(54) POWER LOSS MEMORY BACK-UP

(75) Inventors: Richard P. Mackey, Phoenix, AZ (US); Richard P. Luckett, Phoenix, AZ (US); James D. Warren, Chandler, AZ (US); Sailesh Bissessur, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 09/872,872

(22) Filed: May 31, 2001

(65) Prior Publication Data
US 2002/0184574 A1 Dec. 5, 2002

(51) Int. Cl.
*G06F 11/00* (2006.01)

(52) U.S. Cl. .............................. 714/22; 714/24; 714/27; 713/340

(58) Field of Classification Search ................ 714/22, 714/24, 47; 713/340
See application file for complete search history.

(56) References Cited

U.S. PATENT DOCUMENTS

| | | | | |
|---|---|---|---|---|
| 4,777,626 A | * | 10/1988 | Matsushita et al. | 365/226 |
| 5,182,687 A | * | 1/1993 | Campbell et al. | 360/92 |
| 5,742,800 A | * | 4/1998 | Forehand | 713/500 |
| 6,556,487 B1 | * | 4/2003 | Ratnakumar et al. | 365/189.08 |

* cited by examiner

*Primary Examiner*—Robert Beausoliel
*Assistant Examiner*—Emerson Puente
(74) *Attorney, Agent, or Firm*—Philip A. Pedigo

(57) ABSTRACT

A memory system provides one or more control signals for configuring and controlling a memory sub-system during a power failure or system reset. A power delay circuit and a power fail controller cooperate to quickly place the memory system in a retention state in the event a power failure event is detected. The power delay circuit detects either a reset signal or power failure to initiate the memory retention state. The power delay circuit and power fail controller ensure the memory system is initialized prior to entering the retention state.

12 Claims, 3 Drawing Sheets

POWER LOSS MEMORY BACK-UP

TECHNICAL FIELD

This invention relates to memory management, and more particularly to enhancing data retention of a memory controller during a system reset.

BACKGROUND

Many computing systems include a power-fail system for detecting a power failure and transitioning the computing system from system power to battery power. Typically, the power-fail system places the memory system in an auto refresh mode to retain stored data.

Two factors that effect effective data retention is the speed at which the system enters the retention state and the ability to remain in that state. Most events that place the memory into the self-refresh state are asynchronous and unpredictable. Examples of these events include depressing the reset button the failure of a power supply. Neither of these situations has a predictable duration, and therefore the memory sub-system must be placed in the self-refresh state.

DESCRIPTION OF DRAWINGS

The details of one or more embodiments of the invention are set forth in the accompanying drawings and the description below. Other features, objects, and advantages of the invention will be apparent from the description and drawings, and from the claims.

DETAILED DESCRIPTION

Figure 1:
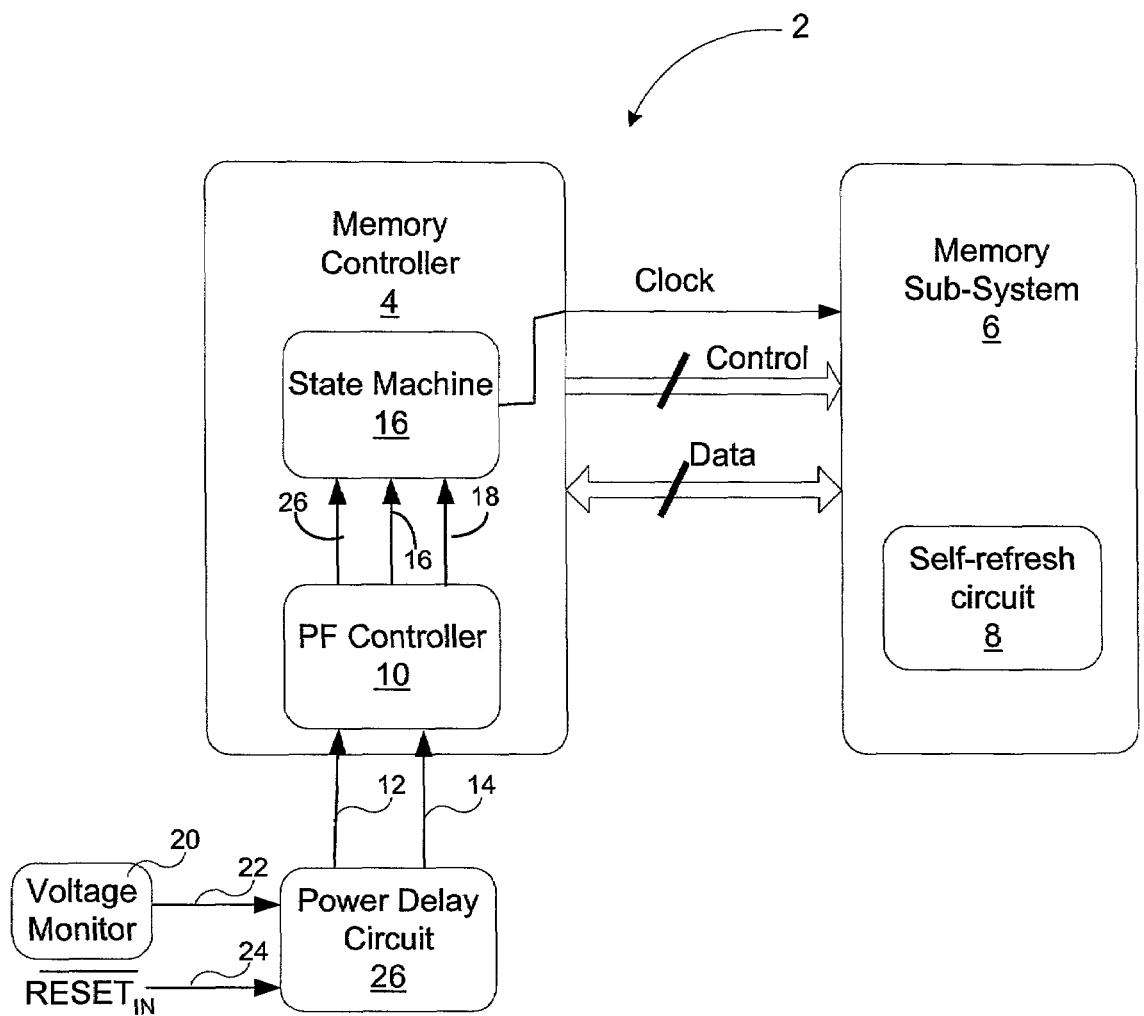
FIG. 1 is a block diagram illustrating an example of a memory system configured according to the invention.

FIG. 1 is a block diagram illustrating an example memory system 2 arranged according to the invention. A memory controller 4 provides one or more control signals for configuring and controlling a memory sub-system 6. The memory sub-system 6 stores digital data and may be any random access memory device such as dynamic random access memory (DRAM), static random access memory (SRAM) or the like.

As described in detail below, a power delay circuit 26 and a power fail controller 10 cooperate to quickly place the memory system 2 in a retention state in the event a power failure event is detected. The memory controller 4 typically includes an internal state machine 16 for controlling the operations of the memory controller 4 and the communication between the memory controller 4 and the memory sub-system 6. For example, in response to a power fail signal, the state machine 16 may direct the memory controller 4 through a sequence to place the memory sub-system 6 in a self-refresh state.

In operation, a voltage monitor 20 monitors the voltage of the system to detect if a power failure has occurred by determining if the voltage falls below a predetermined threshold. If the voltage does fall below the predetermined threshold, the voltage monitor 20 transmits a signal 22 (PWRFAIL) to the power delay circuit 26. A second signal 24 ($RESET_{IN}$) received by the power delay circuit 26 detects if a reset of the system is requested.

The power delay circuit 26 receives the signals 22, 24 and determines if the system is in a reset condition. The reset condition may be caused by a power failure (assertion of the PWRFAIL signal 22) or a reset request (assertion of the $RESET_{IN}$ signal 24). If either signal 22, 24 indicates a reset condition, the power delay circuit 26 transmits a reset signal 12 (RESET) to the power fail controller 10. The power delay circuit also transmits a power delay signal 14 (PWR_DELAYED) to the power fail controller 10.

The power fail controller 10 receives the reset signal 12 and the power delay signal 14 from the power delay circuit 26. The power fail controller 10 asserts the reset signal 26 to the entire chip. However, the power fail controller 10 also sends two signals 16, 18 to the state machine 16 to ensure the self-refresh routine is not issued when the chip is not configured. If the power delay circuit 26 did not detect the reset signal for a finite period of time, the self-refresh circuit will be held in reset to prevent invalid transitioning through the self-refresh sequence. However, if the reset signal is detected long enough and either a power failure or an external reset event is detected, the memory controller 4 self-refresh state machine 16 will execute. Once the self-refresh sequence has been performed, the memory controller would enter the reset state.

Figure 2:
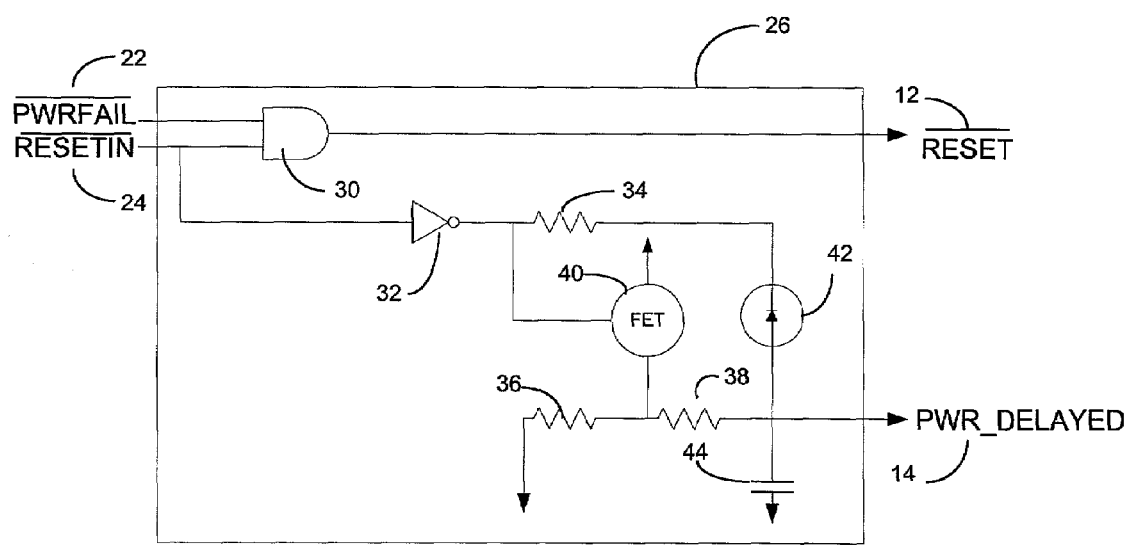
FIG. 2 is a circuit diagram illustrating an example of the power delay circuit of the memory system of FIG. 1.

FIG. 2 is a circuit diagram illustrating an example of the power delay circuit 26 of the memory system 2 of FIG. 1. The power delay circuit 26 includes an AND gate 30, an inverter 32, resistors 38, 34, 36, a transistor 40, a diode 42, and a capacitor 44. The power delay circuit 26 receives the signals 22, 24 and determines if the system is in a reset condition. Each of the signals 22, 24 is provided as an input to the AND gate 30. In this embodiment, each of the signals 22, 24 are active low, and thus if either of the signals are active, the output of the AND gate 30 is driven low, thus activating the active low reset signal 12. Additionally, the reset signal 24 is provided as an input to the inverter 32. The inverter 32 is used to clean up the reset signal 32. The transistor 40, the resistors 34, 36, 38, and the diode 42 comprise a bleed off circuit. The bleed off circuit may act as an RC constant that ensures the power fail signal 22 and the reset signal 24 do not conflict. When the reset signal is high, indicating no reset condition is requested, the signal at the gate of the transistor 40 is low, turning on the active low transistor 40. This provides voltage to the bleed of circuit, and the power delay signal 14 is high. The capacitor 44 provides a stable signal at the power delay signal 14. When the reset signal 24 is active low, the input to the gate of the transistor 40 is high, turning the transistor 40 off. This causes the power delay signal to go low.

Figure 3:
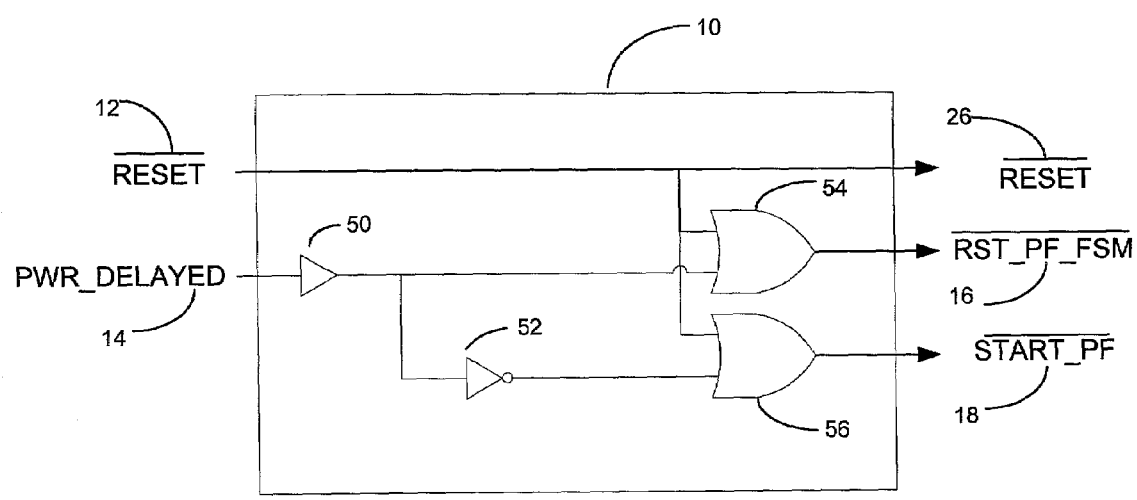
FIG. 3 is a circuit diagram illustrating an example of the power fail controller of the memory system of FIG. 1.

FIG. 3 is a circuit diagram illustrating an example of the power fail controller 10 of the memory system 2 of FIG. 1. The power delay signal 14 is input into a Schmidt trigger 50 to ensure the signal has a clean edge. The output of the Schmidt trigger 50 if provided as an input to a first OR gate 54 and to an inverter 52. The output of the inverter 52 is provided as an input to a second OR gate 56. The reset signal 12 is provided as the second input to the OR gates 54, 56. Therefore, if either the reset signal 12 or the power delay signal 14 is high, the output of the first OR gate 54 is high. This output 16 is a signal (RST_PF_FSM, reset power fail state machine) instructing the state machine 16 to remain in the idle state. If the reset signal 12 is high, or the power delay signal 14 is low, the output of the second OR gate 56 is high. This output 18 is a signal (START_PF, start power fail) instructing the state machine to begin the power fail routine.

Various embodiments of the invention have been described. For example, a single machine instruction has been described that conditionally moves data between a pointer register and a data register. The processor can be implemented in a variety of systems including general purpose computing systems, digital processing systems, laptop computers, personal digital assistants (PDA's) and cellular phones. These and other embodiments are within the scope of the following claims.

What is claimed is:

1. A system comprising:
   a voltage monitor to monitor a voltage of the system and to transmit a voltage monitor signal if the voltage falls below a predetermined threshold;
   a power delay circuit to transmit a power delay signal in response to receiving a voltage monitor signal and to transmit a reset signal if the voltage monitor signal indicates a reset condition or in response to an external event reset signal;
   a memory sub-system to store digital data and having a self-refresh circuit, the self-refresh circuit causing the memory sub-system to enter into a self-refresh sequence; and
   a memory controller to control and configure the memory sub-system, the memory controller having a power fail controller to receive a power delay signal or a reset signal from the power delay circuit, the power controller asserting a system reset signal and sending two configuration signals in response to the power delay signal or external event reset signal, the configuration signals indicating whether the external event reset signal was detected for at least a predetermined amount of time and at least one of a power failure or an external reset event is detected.

2. The system of claim 1, wherein the memory controller further comprises a state machine to receive the system reset signal and the configuration signals and to direct the memory sub-system into a self-refresh state based on the system reset signal and the configuration signals.

3. The system of claim 1, further comprising means for generating an external event signal.

4. The system of claim 1, wherein the power fail controller prevents the self-refresh sequence from executing when the system is not configured.

5. A system comprising:
   a voltage monitor to monitor a voltage of the system and to transmit a voltage monitor signal if the voltage falls below a predetermined threshold;
   means for transmitting a power delay signal and a reset signal, wherein the power delay signal is transmitted in response to receiving a voltage monitor signal and the reset signal is transmitted if the voltage monitor signal indicates a reset condition or in response to an external event reset signal;
   a memory sub-system to store digital data and having a self-refresh circuit, the self-refresh circuit causing the memory sub-system to enter into a self-refresh sequence; and
   a memory controller to control and configure the memory sub-system, the memory controller having a power fail controller to receive a power delay signal or a reset signal from the means for transmitting a power delay signal and a reset signal, the power controller asserting a system reset signal and sending two configuration signals in response to the power delay signal or external event reset signal, the configuration signals indicating whether the external event reset signal was detected for at least a predetermined amount of time and at least one of a power failure or an external reset event is detected.

6. The system of claim 5, wherein the memory controller further comprises a state machine to receive the system reset signal and the configuration signals and to direct the memory sub-system into a self-refresh state based on the system reset signal and the configuration signals.

7. The system of claim 5, further comprising means for generating an external event signal.

8. The system of claim 5, wherein the power fail controller prevents the self-refresh sequence from executing when the system is not configured.

9. A system comprising:
   means for monitoring a voltage of the system and to transmit a voltage monitor signal if the voltage falls below a predetermined threshold;
   a power delay circuit to transmit a power delay signal in response to receiving a voltage monitor signal and to transmit a reset signal if the voltage monitor signal indicates a reset condition or in response to an external event reset signal;
   a memory sub-system to store digital data and having a self-refresh circuit, the self-refresh circuit causing the memory sub-system to enter into a self-refresh sequence; and
   means for controlling and configuring the memory sub-system, the means for controlling and configuring the memory sub-system having a power fail controller to receive a power delay signal or a reset signal from the power delay circuit, the power controller asserting a system reset signal and sending two configuration signals in response to the power delay signal or external event reset signal, the configuration signals indicating whether the external event reset signal was detected for at least a predetermined amount of time and at least one of a power failure or an external reset event is detected.

10. The system of claim 9, wherein the means for controlling and configuring the memory sub-system further comprises a state machine to receive the system reset signal and the configuration signals and to direct the memory sub-system into a self-refresh state based on the system reset signal and the configuration signals.

11. The system of claim 9, further comprising means for generating an external event signal.

12. The system of claim 9, wherein the power fail controller prevents the self-refresh sequence from executing when the system is not configured.

* * * * *